May 17, 1932.  A. B. MERRILL  1,858,680
WATERPROOFED HEAT INSULATING MATERIAL
Filed July 20, 1927

Inventor
Allan B. Merrill
By Pierson, Eakin & Avery,
Attys.

Patented May 17, 1932

1,858,680

UNITED STATES PATENT OFFICE

ALLAN B. MERRILL, OF AKRON, OHIO, ASSIGNOR TO THE B. F. GOODRICH COMPANY, OF NEW YORK, N. Y., A CORPORATION OF NEW YORK

WATERPROOFED HEAT INSULATING MATERIAL

Application filed July 20, 1927. Serial No. 207,128.

This invention relates to heat-insulating materials of fibrous construction, and it has for its object to improve the qualities of such materials principally by way of increasing their resistance to penetration by water and incidentally by adding strength thereto, without substantially impairing their capacity when in a dry state for obstructing the passage of heat.

Figure 1:
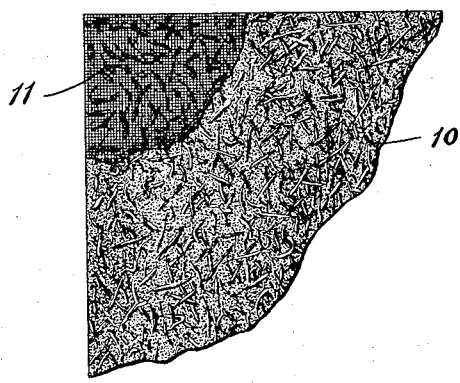

Of the accompanying drawings, Fig. 1 is a face view of a portion of a fibrous board or sheet partially coated with a water-proofing composition in accordance with my invention.

Figure 2:

Fig. 2 is a cross-section of such a board or sheet, with the water-proof coating on the upper surface thereof.

Heat-insulating material of the type to which the invention pertains may consist of a board or sheet of matted or felted vegetable fibers such as those from sugar cane stalk or bagasse. This material, by reason of the coarseness and low density of its fibers, makes a very light board of considerable strength and of highly porous or spongy texture which is useful for a variety of purposes such as sheathing in dwellings, for refrigerators and refrigerator cars, and other places.

In the drawings, this board of matted fibers is shown at 10. In accordance with my invention I coat one or more surfaces of the board 10 with material in which rubber is the principal component, such a coating being shown at 11 in Figs. 1 and 2. This coating is of mere film thickness and is applied in such manner as to adhere firmly to and interlock with the surface fibers of the board 10 without substantially impregnating said board, the coating, including its outer side, conforming closely to the irregularities in the surface of the board, so that when said surface is placed against another surface in the dwelling, refrigerator or other structure in which the board is incorporated, its coated surface will have a minimum amount of contact with the adjacent surface and the heat-insulating properties will be preserved to the maximum extent. An exception to this minimum contact, of course, exists where the coated surface may have a liquid or plastic composition such as plaster or paint applied thereto, but in that case the rough coated surface is useful in another way in that it promotes the adhesion of the coated board to the plaster, paint or the like.

While the rubber coating 11 may be applied in various ways, the preferred mode is to spray upon the surface or surfaces of the board 10 to be coated a water dispersion or emulsion of rubber or rubber compound. This water dispersion may be in the form of natural or artificial latex, which may be compounded with mineral or other fillers and with enough sulfur for vulcanization, together preferably with a rapid accelerator of vulcanization adapted to produce an air curing of the rubber without the aid of artificial heat. Good results have been obtained by using 94.5 parts of a water dispersion of reclaimed rubber from which the free sulfur has been removed by any well known or suitable method, fillers 9 parts, accelerator 0.5 part, sulfur 2 parts, and ammonia, an anticoagulant, 1 part.

In this manner I have successfully used a rubber-coating of about .004 of an inch thickness, applied in two successive sprayed coats with drying between the applications. This thickness may be varied more or less provided the coating is one of film thickness conforming closely to the rough surfaces of the fibrous board. A water dispersion of rubber has the advantage over a solution that there is substantially no impregnation of the fibers and no loss of valuable solvent, the evaporation of the water leaving a solid residue of rubber or rubber compound which can be air cured as above set forth.

This film coating of rubber further serves to bind the surface fibers of the board, reducing their liability to be scuffed off, it adds considerable strength to the board, and it increases the firmness of the surface for the reception of nail heads or other attaching devices.

I claim:

1. A rough-surfaced board or stiff sheet of matted vegetable fibers having unfilled interstices and on a surface thereof having an adherent waterproof film of vulcanized rubber which closely conforms on its outer side to the irregularities of said surface, the surface fibers of which retain their original arrangement.

2. Waterproofed heat-insulating material comprising a rough-surfaced board or stiff sheet composed principally of matted fibers of sugar-cane stalk having unfilled interstices, and an adherent waterproof coating of rubber of film thickness applied to a side of said board, said film closely conforming to the irregularities of the matted surface, the surface fibers of which retain their original arrangement.

3. A board or stiff sheet according to claim 1 in which the rubber coating is the non-volatile constituents of a dispersion of rubber in water.

4. A board or stiff sheet according to claim 1 in which the rubber coating is the non-volatile constituents of a water dispersion of reclaimed, vulcanized rubber.

In witness whereof I have hereunto set my hand this 15th day of July, 1927.

ALLAN B. MERRILL.